US012340740B2

(12) United States Patent
Jang

(10) Patent No.: US 12,340,740 B2
(45) Date of Patent: Jun. 24, 2025

(54) METHOD OF ALIGNING LIGHT EMITTING ELEMENT AND METHOD OF MANUFACTURING DISPLAY DEVICE

(71) Applicant: Samsung Display Co., LTD., Yongin-si (KR)

(72) Inventor: Joo Nyung Jang, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/489,049

(22) Filed: Oct. 18, 2023

(65) Prior Publication Data

US 2024/0331625 A1 Oct. 3, 2024

(30) Foreign Application Priority Data

Apr. 3, 2023 (KR) ........................ 10-2023-0043717

(51) Int. Cl.
*G09G 3/3225* (2016.01)

(52) U.S. Cl.
CPC ....... *G09G 3/3225* (2013.01); *G09G 2230/00* (2013.01); *G09G 2300/0426* (2013.01); *G09G 2330/028* (2013.01)

(58) Field of Classification Search
CPC ............. G09G 3/3225; G09G 2230/00; G09G 2300/0426; G09G 2330/028
USPC ...................................................... 345/55–89
See application file for complete search history.

(56) References Cited

U.S. PATENT DOCUMENTS 7,352,339 B2 * 4/2008 Morgan .................. F24C 7/004 345/31
9,449,543 B2 * 9/2016 Shishido .............. G09G 3/2003
2010/0103089 A1 * 4/2010 Yoshida ............... G09G 3/3426 345/102
2017/0104090 A1 * 4/2017 Koezuka ............. H01L 29/7869
2021/0273131 A1 9/2021 Kang et al.
2022/0028345 A1 * 1/2022 Muir .................... G09G 3/3648

(Continued)

FOREIGN PATENT DOCUMENTS

KR 10-2020-0034898 4/2020
KR 10-2021-0059088 5/2021

(Continued)

OTHER PUBLICATIONS

Eo et al., "Enhanced DC-Operated Electroluminescence of Forwardly Aligned p/MQW/n InGaN Nanorod LEDs via DC Offset-AC Dielectrophoresis", ACS Applied Materials & Interfaces, Oct. 11, 2017, pp. 37912-37920, vol. 9.

*Primary Examiner* — Kwin Xie

(74) *Attorney, Agent, or Firm* — KILE PARK REED & HOUTTEMAN PLLC

(57) ABSTRACT

A method of aligning a light emitting element includes providing an ink comprising light emitting elements on a substrate, a first electrode and a second electrode being disposed on the substrate and spaced apart from each other, and applying an AC voltage to the first electrode and the second electrode. The AC voltage is controlled so that a maximum value of an output AC voltage between the first electrode and the second electrode is higher than a first threshold voltage and a minimum value of the output AC voltage has a magnitude higher than a second threshold voltage, and the first threshold voltage and the second threshold voltage have a same magnitude and opposite polarities.

16 Claims, 14 Drawing Sheets

(56) References Cited

U.S. PATENT DOCUMENTS

| | | | |
|---|---|---|---|
| 2022/0165928 | A1 | 5/2022 | Baek et al. |
| 2022/0406972 | A1 | 12/2022 | Im et al. |

FOREIGN PATENT DOCUMENTS

| | | | | | |
|---|---|---|---|---|---|
| KR | 10-2022-0072098 | | | 6/2022 | |
| TW | 201214002 | A | * | 4/2012 | ........... G02B 26/001 |
| WO | WO-2017006202 | A1 | * | 1/2017 | ............. G02F 1/133 |

* cited by examiner

METHOD OF ALIGNING LIGHT EMITTING ELEMENT AND METHOD OF MANUFACTURING DISPLAY DEVICE

CROSS-REFERENCE TO RELATED APPLICATION(S)

This application claims priority to and benefits of Korean patent application No. 10-2023-0043717 under 35 U.S.C. § 119, filed on Apr. 3, 2023, in the Korean Intellectual Property Office, the entire contents of which are incorporated herein by reference.

BACKGROUND

1. Technical Field

The disclosure relates to a method of manufacturing a display device, and, to a method of aligning a light emitting element on an electrode formed on a substrate.

2. Description of the Related Art

In recent years, as interest in information display is increasing, research and development for a display device are continuously being conducted.

A device displaying an image of a display device comprises a display panel such as a light emitting display panel or a liquid crystal display panel. Among the light emitting display panel and the liquid crystal display panel, the light emitting display panel may display an image by emitting light using a light emitting element. At this time, in case that a light emitting diode (LED) is used as a light emitting element, an organic light emitting diode (OLED) using an organic material as a fluorescent material or an inorganic light emitting diode using an inorganic material as a fluorescent material may be used as the light emitting element.

In a manufacturing process of the display device, a plurality of light emitting elements may be disposed between electrodes provided on a substrate, and at this time, light emitting elements disposed in a forward direction may normally emit light in case that the display device is driven, but light emitting elements disposed in a reverse direction may not emit light. Therefore, biasing the plurality of light emitting elements between the electrodes in a same direction may be important.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An aspect to be solved by the disclosure is to provide a method of manufacturing a display device capable of improving a bias rate of light emitting elements in case that aligning the light emitting elements between alignment electrodes formed on a substrate.

Aspects of the disclosure are not limited to the above-described aspect, and other technical aspects will be clearly understood by those skilled in the art from the following description.

According to an embodiment of the disclosure, a method of aligning a light emitting element may comprise providing an ink comprising a plurality of light emitting elements on a substrate; a first electrode and a second electrode being disposed on the substrate and spaced apart from each other; and applying an alternating current (AC) voltage to the first electrode and the second electrode. The AC voltage may be controlled so that a maximum value of an output AC voltage between the first electrode and the second electrode is higher than a first threshold voltage and a minimum value of the output AC voltage has a magnitude higher than a second threshold voltage, and the first threshold voltage and the second threshold voltage may have a same magnitude and opposite polarities.

In an embodiment, the magnitude of the first threshold voltage and the second threshold voltage may be determined by a force acting on an induced dipole generated in the plurality of light emitting elements by the output AC voltage provided between the first electrode and the second electrode.

In an embodiment, a waveform of the output AC voltage may change according to an impedance value of an equivalent circuit electrically connected between the first electrode and the second electrode, and the impedance value may be set so that the maximum value of the output AC voltage is higher than the first threshold voltage and the minimum value of the output AC voltage has a magnitude higher than the second threshold voltage.

In an embodiment, the maximum value of the output AC voltage may decrease as the impedance value increases, and the minimum value of the output AC voltage may increase as the impedance value increases.

In an embodiment, at least one of a resistor and a capacitor may be electrically connected between any one of input terminals to which the AC voltage is input and any one of the first electrode and the second electrode, and the impedance value may be determined based on at least one of the resistor and the capacitor.

In an embodiment, the method may further comprise separating the resistor and the capacitor from the first electrode and the second electrode after the plurality of light emitting elements are aligned to the first electrode and the second electrode.

In an embodiment, a waveform of the AC voltage may have a sawtooth waveform.

In an embodiment, a waveform of the output AC voltage may have an asymmetrical waveform.

In an embodiment, the AC voltage may be a voltage comprising a direct current (DC) offset voltage.

According to an embodiment of the disclosure, a method of manufacturing a display device may comprise disposing a first electrode and a second electrode spaced apart from the first electrode on a substrate; providing an ink comprising a plurality of light emitting elements on the substrate; and aligning the plurality of light emitting elements on the first electrode and the second electrode. The aligning of the plurality of light emitting elements on the first electrode and the second electrode may comprise applying an alternating current (AC) voltage to the first electrode and the second electrode, the AC voltage may be controlled so that a maximum value of an output AC voltage between the first electrode and the second electrode is higher than a first threshold voltage and a minimum value of the output AC voltage has a magnitude higher than a second threshold voltage, and the first threshold voltage and the second threshold voltage may have a same magnitude and opposite polarities.

In an embodiment, a waveform of the output AC voltage may change according to an equivalent circuit of an impedance value electrically connected between the first electrode and the second electrode, and the impedance value may be set so that the maximum value of the output AC voltage is higher than the first threshold voltage and the minimum value of the output AC voltage has a magnitude higher than the second threshold voltage.

In an embodiment, the maximum value of the output AC voltage may decrease as the impedance value increases, and the minimum value of the output AC voltage may increase as the impedance value increases.

In an embodiment, at least one of a resistor and a capacitor may be electrically connected between any one of input terminals to which the AC voltage is input and any one of the first electrode and the second electrode, and the impedance value may be determined based on at least one of the resistor and the capacitor.

In an embodiment, the method may further comprise separating the resistor and the capacitor from the first electrode and the second electrode after the light emitting element is aligned to the first electrode and the second electrode.

In an embodiment, a waveform of the AC voltage may have a sawtooth waveform.

According to an embodiment of the disclosure, in a process of aligning the light emitting elements on the alignment electrode, a bias rate of the light emitting elements may be improved by adjusting an equivalent circuit of an impedance value electrically connected between an input terminal and an output terminal of the AC voltage applied between the alignment electrodes.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
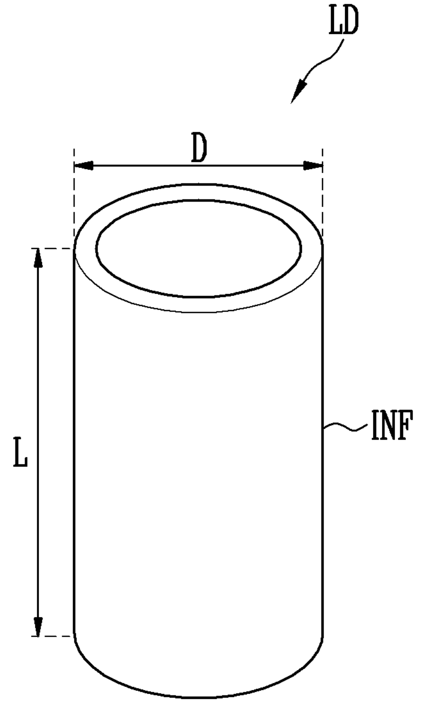
FIGS. 1 and 2 are schematic perspective view and schematic cross-sectional view illustrating a light emitting element according to an embodiment.

The disclosure may be modified in various manners and have various forms. Therefore, embodiments will be illustrated in the drawings and will be described in detail in the specification. However, it should be understood that the disclosure is not intended to be limited to the disclosed forms, and the disclosure comprises all modifications, equivalents, and substitutions within the spirit and technical scope of the disclosure.

Similar reference numerals are used for similar components in describing each drawing. In the accompanying drawings, the dimensions of the structures are shown enlarged from the actual dimensions for the sake of clarity of the disclosure.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component.

It should be understood the terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

Where a portion of a layer, a film, an area, a plate, or the like is referred to as being "on" another portion, it comprises not only a case where the portion is "directly on" another portion, but also a case where there is further another portion between the portion and another portion. In the specification, when a portion of a layer, a film, an area, a plate, or the like is formed on another portion, a forming direction is not limited to an upper direction but comprises forming the portion on a side surface or in a lower direction. On the contrary, when a portion of a layer, a film, an area, a plate, or the like is formed "under" another portion, this comprises not only a case where the portion is "directly beneath" another portion but also a case where there is further another portion between the portion and another portion.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

In the application, in a case where "a component (for example, 'a first component') is operatively or communicatively coupled with/to or "connected to" another component (for example, 'a second component'), the case should be understood that the component may be directly connected to the other component, or may be connected to the other component through another component (for example, a 'third component') or other components. In contrast, in a case where a component (for example, 'a first component') is "directly coupled with/to or "directly connected" to another component (for example, 'a second component'), the case may be understood that another component (for example, 'a third component') is not present between the component and the other component.

Hereinafter, embodiments and others necessary for those skilled in the art to understand the disclosure will be described in detail with reference to the accompanying drawings.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
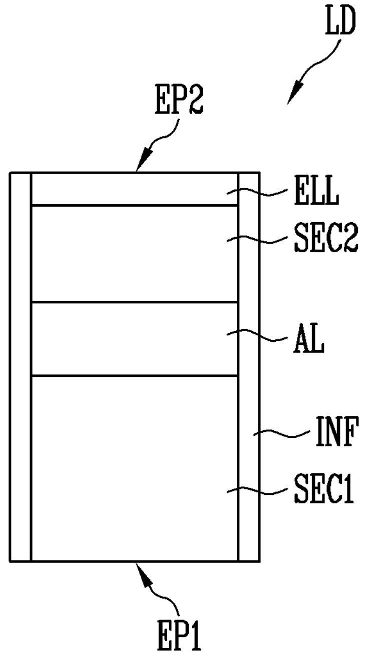

FIGS. 1 and 2 illustrate a light emitting element LD comprised in a display device according to an embodiment. FIGS. 1 and 2 are schematic perspective view and schematic cross-sectional view illustrating a light emitting element according to an embodiment.

Referring to FIGS. 1 and 2, the light emitting element LD may comprise a first semiconductor layer SEC1 and a second semiconductor layer SEC2, and an active layer AL interposed between the first semiconductor layer SEC1 and the second semiconductor layer SEC2. The light emitting element LD may further comprise an electrode layer ELL. According to an embodiment, the first semiconductor layer SEC1, the active layer AL, the second semiconductor layer SEC2, and the electrode layer ELL may be sequentially stacked each other along a length L direction of the light emitting element LD.

The light emitting element LD may have a first end EP1 and a second end EP2. The first semiconductor layer SEC1 may be adjacent to the first end EP1 of the light emitting element LD. The second semiconductor layer SEC2 and the electrode layer ELL may be adjacent to the second end EP2 of the light emitting element LD.

According to an embodiment, the light emitting element LD may have a pillar shape. The pillar shape may mean a shape extending in the length L direction, such as a cylinder or polygonal pillar. For example, a length L of the light emitting element LD may be greater than a diameter D (or a width of a cross-section). A shape of the cross-section of the light emitting element LD comprises a rod-like shape and a bar-like shape, but is not limited thereto and may include shapes substantial to the shapes illustrated or disclosed herein.

The light emitting element LD may have a size of a nano (nanometer) scale to a micro (micrometer) scale. For example, each of the diameter D (or the width) and the length L of the light emitting element LD may have the size of the nano scale to the micro scale, but is not limited thereto.

The first semiconductor layer SEC1 may be a semiconductor layer of a first conductivity type. For example, the first semiconductor layer SEC1 may comprise an n-type semiconductor layer. For example, the first semiconductor layer SEC1 may comprise a semiconductor material of any one of InAlGaN, GaN, AlGaN, InGaN, AlN, and InN, and may comprise an n-type semiconductor layer doped with a first conductivity type dopant such as Si, Ge, and Sn. However, a material forming the first semiconductor layer SEC1 is not limited thereto, and the first semiconductor layer SEC1 may be other various materials.

The active layer AL may be disposed on the first semiconductor layer SEC1. The active layer AL may be disposed between the first semiconductor layer SEC1 and the second semiconductor layer SEC2.

The active layer AL may comprise any one of AlGaInP, AlGaP, AlInGaN, InGaN, and AlGaN. For example, in case that the active layer AL intends to output red light, the active layer AL may comprise AlGaInP and/or InGaN. In case that the active layer AL intends to output green light or blue light, the active layer AL may comprise InGaN. However, the active layer AL is not limited to the above-described example.

The active layer AL may be formed in a single-quantum well or multi-quantum well structure.

The second semiconductor layer SEC2 may be disposed on the active layer AL and may comprise a semiconductor layer of a type different from that of the first semiconductor layer SEC1. For example, the second semiconductor layer SEC2 may comprise a p-type semiconductor layer. For example, the second semiconductor layer SEC2 may comprise at least one semiconductor material among InAlGaN, GaN, AlGaN, InGaN, AlN, and InN, and may comprise a p-type semiconductor layer doped with a second conductivity type dopant such as Mg. However, a material forming the second semiconductor layer SEC2 is not limited thereto, and the second semiconductor layer SEC2 may be various other materials.

The electrode layer ELL may be formed on the second semiconductor layer SEC2. The electrode layer ELL may comprise a metal or a metal oxide. According to an example, the electrode layer ELL may comprise at least one of Cr, Ti, Al, Au, Ni, ITO, IZO, ITZO, and an oxide or an alloy thereof.

In case that a voltage equal to or greater than a threshold voltage is applied to both ends of the light emitting element LD, the light emitting element LD emits light while an electron-hole pair is combined in the active layer AL. By controlling light emission of the light emitting element LD using such a principle, the light emitting element LD may be used as a light source of various light emitting devices comprising a pixel of a display device (refer to 'DD' of FIG. 3).

The light emitting element LD may further comprise an insulating film INF provided on a surface thereof. The insulating film INF may be formed of a single film or a plurality of films.

The insulating film INF may expose the both ends of the light emitting element LD having different polarities. For example, the insulating film INF may expose a portion of each of the first semiconductor layer SEC1 disposed adjacent to the first end EP1 and the electrode layer ELL disposed adjacent to the second end EP2.

The insulating film INF may comprise at least one insulating material among silicon oxide ($SiO_x$), silicon nitride ($SiN_x$), silicon oxynitride ($SiO_xN_y$), aluminum oxide ($AlO_x$), and titanium oxide ($TiO_x$). However, the insulating film INF is not limited to a given example.

The insulating film INF may secure electrical stability of the light emitting element LD. Even in a case where the plurality of light emitting elements LD are disposed close to each other, occurrence of an unwanted short between the light emitting elements LD may be prevented.

According to an embodiment, the light emitting element LD may further comprise an additional configuration in addition to the first semiconductor layer SEC1, the active layer AL, the second semiconductor layer SEC2, the electrode layer ELL, and the insulating film INF. For example, the light emitting element LD may further comprise a phosphor layer, an active layer, a semiconductor layer, and/or an electrode layer.

Figure 3:
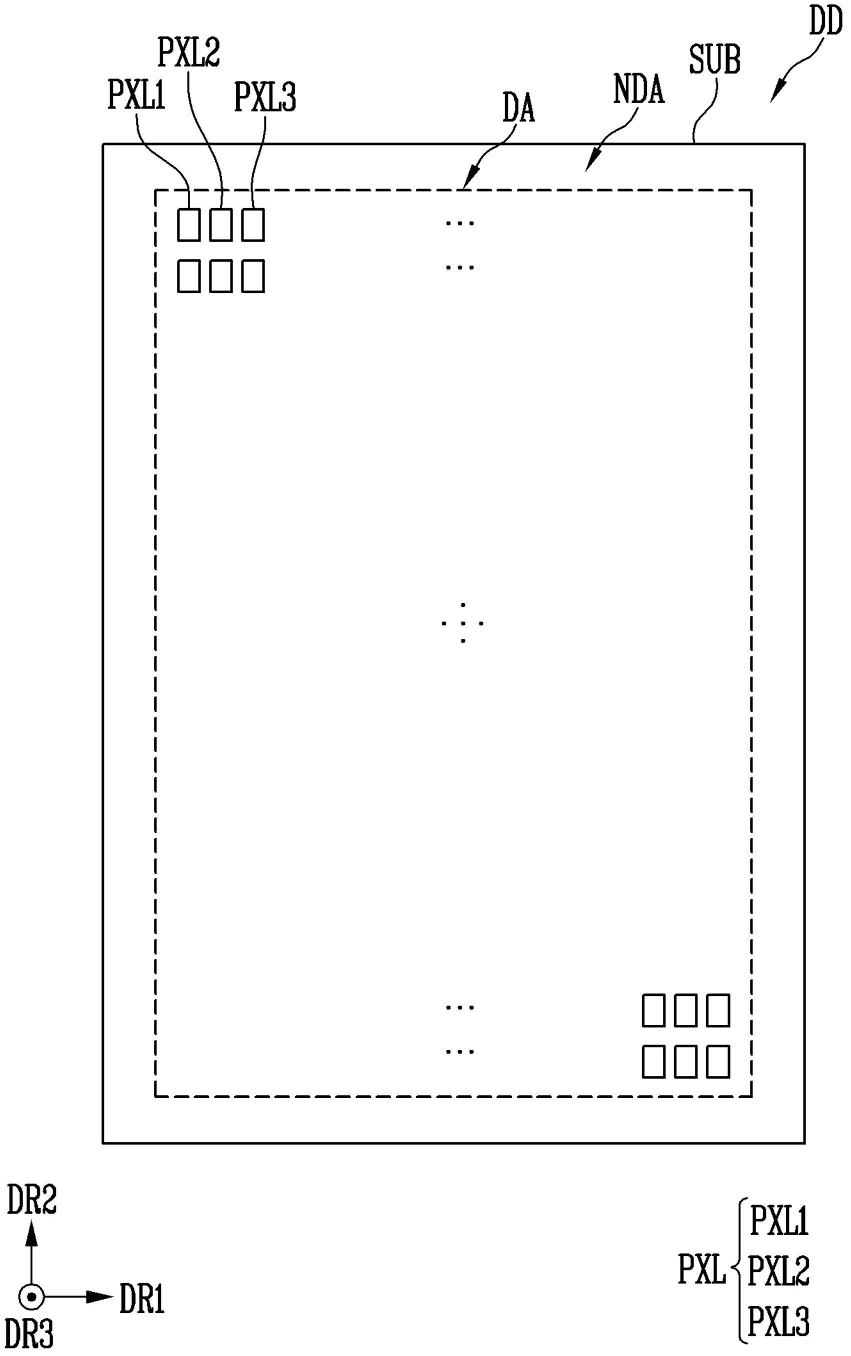
FIG. 3 is a schematic plan view schematically illustrating a display device according to an embodiment.

FIG. 3 is a schematic plan view schematically illustrating a display device according to an embodiment.

The display device DD emits light. Referring to FIG. 3, the display device DD may comprise a substrate SUB and a pixel PXL disposed on the substrate SUB. Although not shown in the drawing, the display device DD may further comprise a driving circuit unit (for example, a scan driver and a data driver), lines, and pads for driving the pixel PXL.

The display device DD may comprise a display area DA and a non-display area NDA. The non-display area NDA may mean an area other than the display area DA. The non-display area NDA may surround or be adjacent to at least a portion of the display area DA.

The substrate SUB may be a base member of the display device DD. The substrate SUB may be a rigid or flexible substrate or film, but is not limited to a given example.

The display area DA may mean an area in which the pixel PXL is disposed. The non-display area NDA may mean an area in which the pixel PXL is not disposed. In the non-display area NDA, the driving circuit unit, the lines, and the pads connected to the pixel PXL of the display area DA may be disposed.

According to an example, the pixel PXL may be arranged or disposed according to a stripe or a PENTILE™ arrangement structure, but this disclosure is not limited thereto, and various other embodiments may be applied.

According to an embodiment, the pixel PXL may comprise a first pixel PXL1, a second pixel PXL2, and a third pixel PXL3. Each of the first pixel PXL1, the second pixel PXL2, and the third pixel PXL3 may be a sub-pixel. At least one of the first pixel PXL1, the second pixel PXL2, and the third pixel PXL3 may form one pixel unit capable of emitting light of various colors.

For example, each of the first pixel PXL1, the second pixel PXL2, and the third pixel PXL3 may emit light of a given color. For example, the first pixel PXL1 may be a red pixel emitting light of red (for example, a first color), the second pixel PXL2 may be a green pixel emitting light of green (for example, a second color), and the third pixel PXL3 may be a blue pixel emitting light of blue (for example, a third color). However, a color, a type, the number, and/or the like of each of the first pixel PXL1, the second pixel PXL2, and the third pixel PXL3 forming the pixel unit are/is not limited to a given example.

Figure 4:
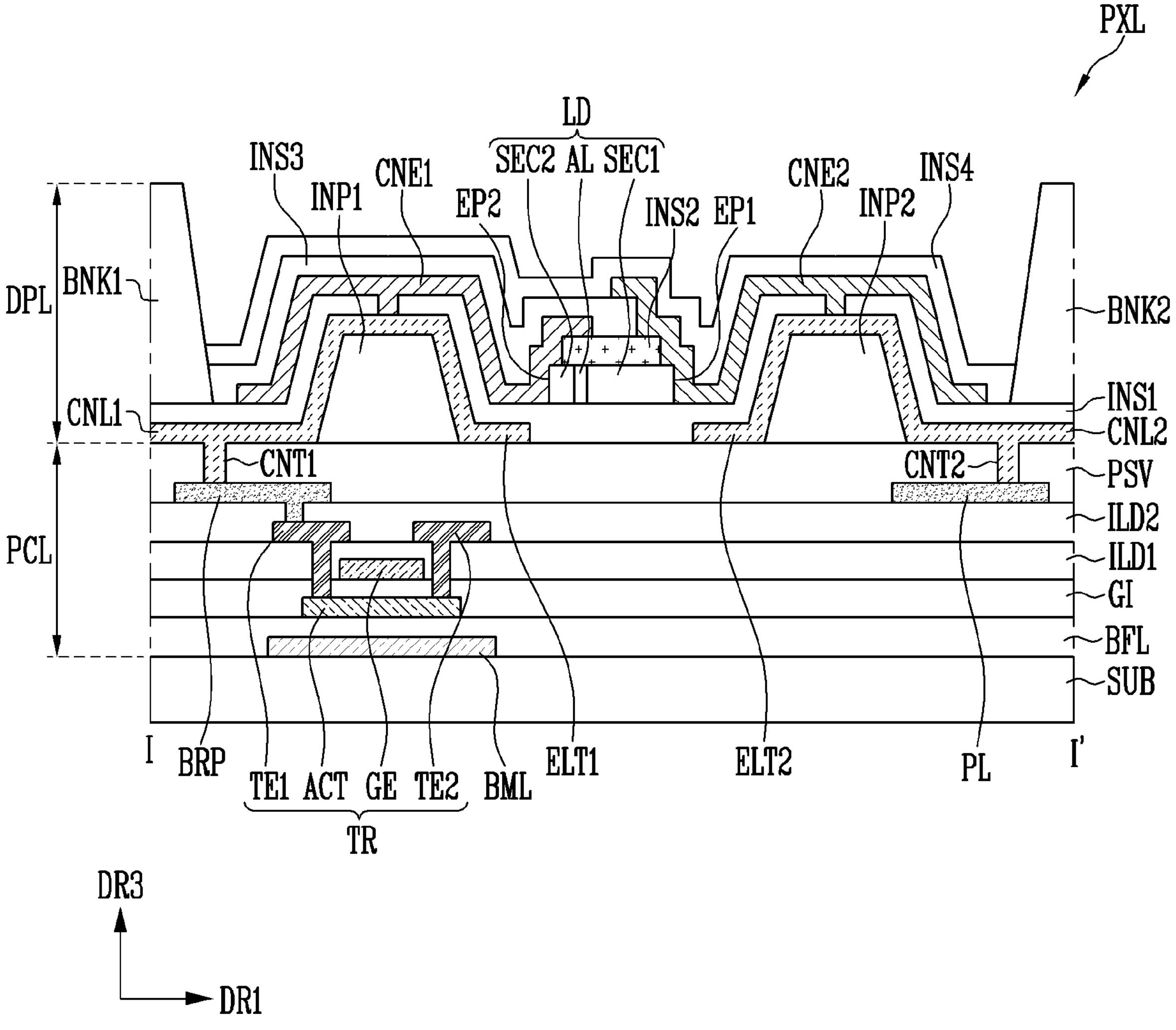
FIG. 4 is a schematic cross-sectional view of a pixel according to an embodiment.

FIG. 4 is a schematic cross-sectional view of a pixel according to an embodiment.

Referring to FIG. 4, the pixel PXL may comprise a substrate SUB, a pixel-circuit part PCL, and a display element part DPL.

The substrate SUB may be a base member of the display device DD. The substrate SUB may be a rigid or flexible substrate or film, but is not limited to a given example. The substrate SUB may be provided as a base surface, and the pixel-circuit part PCL and the display element part DPL may be disposed on the substrate SUB.

The pixel-circuit part PCL may be disposed on the substrate SUB. The pixel-circuit part PCL may comprise a lower electrode layer (or a bottom metal layer) BML, a buffer layer BFL, a transistor TR, a gate insulating layer GI, a first interlayer insulating layer ILD1, a second interlayer insulating layer ILD2, a bridge pattern BRP, a power line PL, a protective layer (or a passivation layer) PSV, a first contact portion CNT1, and a second contact portion CNT2.

The lower electrode layer BML may be disposed on the substrate SUB and covered by the buffer layer BFL. A portion of the lower electrode layer BML may overlap the transistor TR in a plan view.

According to an embodiment, the lower electrode layer BML may comprise a conductive material and function as a path through which an electrical signal provided to the pixel-circuit part PCL and the display element part DPL moves. For example, the lower electrode layer BML may comprise any one of aluminum (Al), copper (Cu), titanium (Ti), and molybdenum (Mo).

The buffer layer BFL may be disposed on the substrate SUB. The buffer layer BFL may prevent an impurity from diffusing from an outside. The buffer layer BFL may comprise at least one of a metal oxide such as silicon nitride ($SiN_x$), silicon oxide ($SiO_x$), silicon oxynitride ($SiO_xN_y$), and aluminum oxide ($AlO_x$).

The transistor TR may be a thin film transistor. According to an embodiment, the transistor TR may be a driving transistor.

The transistor TR may be electrically connected to the light emitting element LD. The transistor TR may be electrically connected to the bridge pattern BRP. However, the transistor TR is not limited to the above-described example. According to an example, the transistor TR may be electrically connected to a first connection electrode CNL1 without passing through the bridge pattern BRP.

The transistor TR may comprise an active layer ACT, a first transistor electrode TE1, a second transistor electrode TE2, and a gate electrode GE.

The active layer ACT may refer to a semiconductor layer. The active layer ACT may be disposed on the buffer layer BFL. According to an example, the active layer ACT may comprise any one of polysilicon, amorphous silicon, and an oxide semiconductor.

The active layer ACT may comprise a first contact area that is in contact with the first transistor electrode TE1, and a second contact area that is in contact with the second transistor electrode TE2. The first contact area and the second contact area may be semiconductor patterns doped with impurities. An area between the first contact area and the second contact area may be a channel area. The channel area may be an intrinsic semiconductor pattern that is not doped with an impurity.

The gate electrode GE may be disposed on the gate insulating layer GI. A position of the gate electrode GE may correspond to a position of the channel area of the active layer ACT. For example, the gate electrode GE may be disposed on the channel area of the active layer ACT with the gate insulating layer GI interposed therebetween. According to an example, the gate electrode GE may comprise any one of aluminum (Al), copper (Cu), titanium (Ti), and molybdenum (Mo).

The gate insulating layer GI may be disposed on the active layer ACT. The gate insulating layer GI may comprise an inorganic material. According to an example, the gate insulating layer GI may comprise at least one of silicon nitride ($SiN_x$), silicon oxide ($SiO_x$), silicon oxynitride ($SiO_xN_y$), and aluminum oxide ($AlO_x$).

The first interlayer insulating layer ILD1 may be disposed on the gate electrode GE. Similar to the gate insulating layer GI, the first interlayer insulating layer ILD1 may comprise at least one of silicon nitride ($SiN_x$), silicon oxide ($SiO_x$), silicon oxynitride ($SiO_xN_y$), and aluminum oxide ($AlO_x$).

The first transistor electrode TE1 and the second transistor electrode TE2 may be disposed on the first interlayer insulating layer ILD1. The first transistor electrode TE1 may pass through the gate insulating layer GI and the first interlayer insulating layer ILD1 to be in contact with the first contact area of the active layer ACT, and the second transistor electrode TE2 may pass through the gate insulating layer GI and the first interlayer insulating layer ILD1 to be in contact with the second contact area of the active layer ACT. According to an example, the first transistor electrode TE1 may be a drain electrode, and the second transistor electrode TE2 may be a source electrode, but are not limited thereto.

The second interlayer insulating layer ILD2 may be disposed on the first transistor electrode TE1 and the second transistor electrode TE2. Similar to the first interlayer insulating layer ILD1 and the gate insulating layer GI, the second interlayer insulating layer ILD2 may comprise an inorganic material. The inorganic material may comprise at least one of materials for example as configuration materials of the first interlayer insulating layer ILD1 and the gate insulating layer GI, for example, silicon nitride ($SiN_x$), silicon oxide ($SiO_x$), silicon oxynitride ($SiO_xN_y$), and aluminum oxide ($AlO_x$).

The bridge pattern BRP may be disposed on the second interlayer insulating layer ILD2. The bridge pattern BRP may be connected to the first transistor electrode TE1 through a contact hole passing through the second interlayer insulating layer ILD2. The bridge pattern BRP may be electrically connected to the first connection electrode CNL1 through the first contact portion CNT1 formed in the protective layer PSV.

The power line PL may be disposed on the second interlayer insulating layer ILD2. The power line PL may be electrically connected to a second connection electrode CNL2 through the second contact portion CNT2 formed in the protective layer PSV. The power line PL may provide power (or a cathode signal) to the light emitting element LD through a second electrode.

The protective layer PSV may be disposed on the second interlayer insulating layer ILD2. The protective layer PSV may cover the bridge pattern BRP and the power line PL. The protective layer PSV may be a via layer.

According to an embodiment, the protective layer PSV may be provided in a form comprising an organic insulating layer, an inorganic insulating layer, or an organic insulating layer disposed on an inorganic insulating layer, but is not limited thereto.

According to an embodiment, the first contact portion CNT1 connected to one area of the bridge pattern BRP and the second contact portion CNT2 connected to one area of the power line PL may be formed on the protective layer PSV.

The display element part DPL may be disposed on the pixel-circuit part PCL. The display element part DPL may comprise a first insulating pattern INP1, a second insulating pattern INP2, the first connection electrode CNL1, the second connection electrode CNL2, a first electrode ELT1, a second electrode ELT2, a first insulating layer INS1, the light emitting element LD, a second insulating layer INS2, a first contact electrode CNE1, a second contact electrode CNE2, and a third insulating layer INS3.

The first insulating pattern INP1 and the second insulating pattern INP2 may be disposed on the protective layer PSV. The first insulating pattern INP1 and the second insulating pattern INP2 may have a shape protruding in a display direction (for example, a third direction DR3) of the display device DD. According to an example, the first insulating pattern INP1 and the second insulating pattern INP2 may comprise an organic material or an inorganic material, but are not limited thereto.

The first connection electrode CNL1 and the second connection electrode CNL2 may be disposed on the protective layer PSV. The first connection electrode CNL1 may be connected to the first electrode ELT1. The first connection electrode CNL1 may be electrically connected to the bridge pattern BRP through the first contact portion CNT1. The first connection electrode CNL1 may electrically connect the bridge pattern BRP and the first electrode ELT1. The second connection electrode CNL2 may be connected to the second electrode ELT2. The second connection electrode CNL2 may be electrically connected to the power line PL through the second contact portion CNT2. The second connection electrode CNL2 may electrically connect the power line PL and the second electrode ELT2.

The first electrode ELT1 and the second electrode ELT2 may be disposed on the protective layer PSV. According to an embodiment, at least a portion of the first electrode ELT1 may be arranged or disposed on the first insulating pattern INP1, and at least a portion of the second electrode ELT2 may be arranged or disposed on the second insulating pattern INP2, so as to function as reflective partition walls, respectively.

The first electrode ELT1 may be electrically connected to the light emitting element LD. The first electrode ELT1 may be electrically connected to the first contact electrode CNE1 through a contact hole formed in the first insulating layer INS1. The first electrode ELT1 may provide an anode signal to the light emitting element LD.

The second electrode ELT2 may be electrically connected to the light emitting element LD. The second electrode ELT2 may be electrically connected to the second contact electrode CNE2 through a contact hole formed in the first insulating layer INS1. The second electrode ELT2 may apply a cathode signal (for example, a ground signal) to the light emitting element LD.

The first electrode ELT1 and the second electrode ELT2 may comprise a conductive material. For example, the first electrode ELT1 and the second electrode ELT2 may comprise a metal such as silver (Ag), magnesium (Mg), aluminum (Al), platinum (Pt), palladium (Pd), gold (Au), and nickel (Ni), neodymium (Nd), iridium (Ir), chromium (Cr), titanium (Ti), and an alloy thereof. However, the first electrode ELT1 and the second electrode ELT2 are not limited to the above-described example.

According to an embodiment, the first electrode ELT1 and the second electrode ELT2 may function as alignment electrodes for the light emitting element LD. For example, the light emitting element LD may be arranged or disposed based on an electrical signal provided from the first electrode ELT1 and the second electrode ELT2.

The first insulating layer INS1 may be disposed on the protective layer PSV. The first insulating layer INS1 may cover the first electrode ELT1 and the second electrode ELT2. The first insulating layer INS1 may stabilize a connection between electrode configurations and reduce an external influence. The first insulating layer INS1 may comprise at least one of silicon nitride ($SiN_x$), silicon oxide ($SiO_x$), silicon oxynitride ($SiO_xN_y$), and aluminum oxide ($AlO_x$).

The light emitting element LD may be disposed on the first insulating layer INS1 to emit light based on an electrical signal provided from the first contact electrode CNE1 and the second contact electrode CNE2.

As described above with reference to FIGS. 1 and 2, the light emitting element LD may comprise the first end EP1 and the second end EP2.

According to an embodiment, the first end EP1 of the light emitting element LD may be disposed to face the second electrode ELT2 and the second contact electrode CNE2, and the second end EP2 of the light emitting element LD may be disposed to face the first electrode ELT1 and the first contact electrode CNE1.

Accordingly, the first semiconductor layer SEC1 of the light emitting element LD may be adjacent to the second electrode ELT2 and the second contact electrode CNE2, and the second semiconductor layer SEC2 of the light emitting element LD may be adjacent to the first electrode ELT1 and the first contact electrode CNE1.

The second insulating layer INS2 may be disposed on the light emitting element LD. The second insulating layer INS2 may cover the active layer AL of the light emitting element LD. According to an example, the second insulating layer INS2 may comprise at least one of an organic material and an inorganic material.

The first contact electrode CNE1 and the second contact electrode CNE2 may be disposed on the first insulating layer INS1. The first contact electrode CNE1 may electrically connect the first electrode ELT1 and the light emitting element LD, and the second contact electrode CNE2 may electrically connect the second electrode ELT2 and the light emitting element LD.

According to an embodiment, the first contact electrode CNE1 may provide the anode signal to the light emitting element LD, and the second contact electrode CNE2 may provide the cathode signal to the light emitting element LD.

The first contact electrode CNE1 and the second contact electrode CNE2 may comprise a conductive material. According to an example, the first contact electrode CNE1 and the second contact electrode CNE2 may comprise a transparent conductive material comprising indium tin oxide (ITO), indium zinc oxide (IZO), and indium tin zinc oxide (ITZO), but are not limited thereto.

The third insulating layer INS3 may be disposed on the first contact electrode CNE1. The third insulating layer INS3 may comprise any one of materials described, for example, with reference to the first insulating layer INS1. According to an embodiment, a portion of the third insulating layer INS3 may be disposed between the first contact electrode CNE1 and the second contact electrode CNE2, to prevent the first contact electrode CNE1 and the second contact electrode CNE2 from being electrically shorted each other.

A fourth insulating layer INS4 may be disposed on the first contact electrode CNE1, the second contact electrode CNE2, and the third insulating layer INS3. The fourth insulating layer INS4 may protect an individual configuration of the display element part DPL. According to an example, the fourth insulating layer INS4 may comprise at least one of silicon nitride ($SiN_x$), silicon oxide ($SiO_x$), silicon oxynitride ($SiO_xN_y$), and aluminum oxide ($AlO_x$).

A structure of the pixel PXL is not limited to the example described above with reference to FIG. 4, and various deformable embodiments may be implemented.

For example, the pixel PXL may further comprise a planarization layer for offsetting a step difference of the individual configurations. According to an embodiment, a color conversion part comprising a quantum dot formed to change a wavelength of light may be disposed on the display element part DPL, and according to an embodiment, a color filter that selectively transmits light having a given wavelength may be further disposed.

Figure 5A:
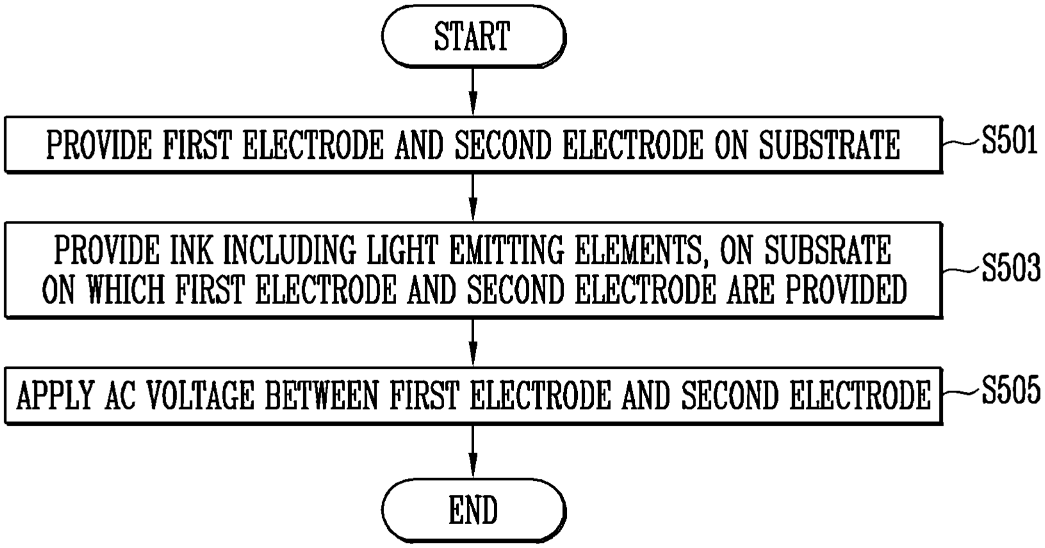
FIGS. 5A and 5B are schematic diagrams illustrating in detail a process in which light emitting elements are aligned on an alignment electrode.
Figure 5B:
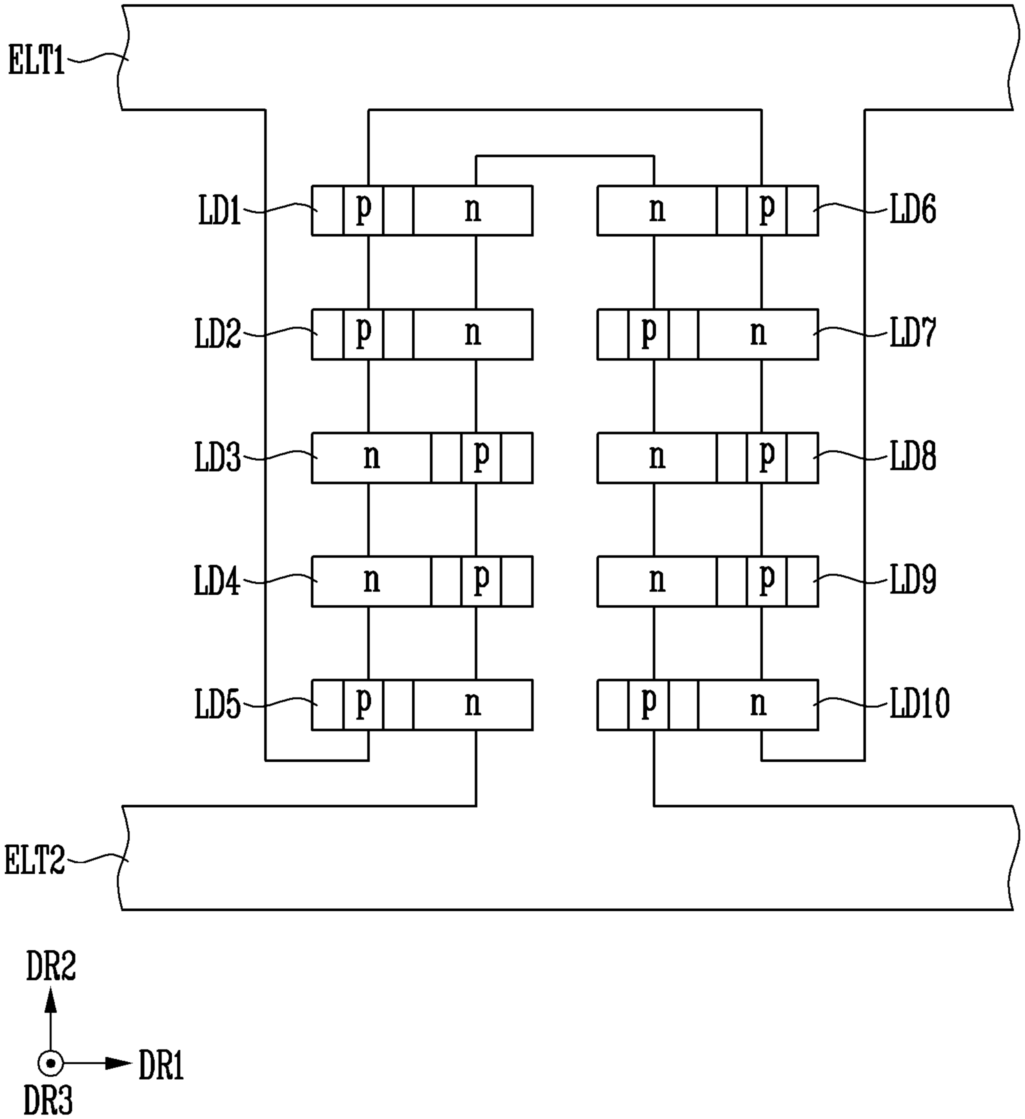

FIGS. 5A and 5B are schematic diagrams illustrating in detail a process in which the light emitting elements are aligned on an alignment electrode.

Referring to FIG. 5A, in step S501, the first electrode and the second electrode may be provided on the substrate. As described with reference to FIG. 4, the substrate may be in a state after the protective layer PSV is disposed on the second interlayer insulating layer ILD2. After the first electrode and the second electrode are provided on the substrate, the first insulating layer INS1 may be disposed on the first electrode and the second electrode as described with reference to FIG. 4.

In step S503, an ink comprising a solvent and a plurality of light emitting elements may be provided on the substrate provided with the first electrode and the second electrode. For example, the solvent may be a liquid mixture having liquidity, and the plurality of light emitting elements may be dispersed in the solvent.

In step S505, an AC voltage may be applied between the first electrode and the second electrode. A frequency of the AC voltage may be selected to be sufficiently high so that the light emitting elements present in the ink are seated between the first electrode and the second electrode. In case that the AC voltage is applied between the first electrode and the second electrode, the light emitting elements may be seated between the first electrode and the second electrode by dielectrophoretic force. In an embodiment, a waveform of the AC voltage may be an asymmetrical waveform. In an embodiment, the waveform of the AC voltage may have a sawtooth waveform.

Referring to FIGS. 4 and 5B, after the first electrode ELT1 and the second electrode ELT2 are disposed on the substrate, the plurality of light emitting elements LD1 to LD10 may be aligned between the first electrode ELT1 and the second electrode ELT2. By way of example, after the first electrode ELT1 and the second electrode ELT2 are disposed to be spaced apart from each other on the substrate SUB, the ink comprising the plurality of light emitting elements LD1 to LD10 may be provided. Thereafter, an AC voltage having a given frequency and magnitude may be applied between the first electrode ELT1 and the second electrode ELT2. In case that the AC voltage is applied between the first electrode ELT1 and the second electrode ELT2, an electric field may be formed between the first electrode ELT1 and the second electrode ELT. In case that the electric field is formed between the first electrode ELT1 and the second electrode ELT, the plurality of light emitting elements LD1 to LD10 may be seated between the first electrode ELT1 and the second electrode ELT2 by the dielectrophoretic force. The dielectrophoretic force may act on an induced dipole in a non-uniform electric field. At this time, each of the plurality of light emitting elements LD1 to LD10 may be seated between the first electrode ELT1 and the second electrode ELT2 in a state in which each of the plurality of light emitting elements LD1 to LD10 is biased in a first direction DR1 or a direction directly opposite to the first direction DR1.

In case that the display device is driven, a portion of the plurality of light emitting elements LD1 to LD10 may not normally emit light. For example, as described with reference to FIG. 4, in case that the transistor TR is connected to the first electrode ELT1, the power line PL is connected to the second electrode ELT2, and the display device is driven, a current may flow from the transistor TR to the power line PL via the light emitting element LD. At this time, light emitting elements aligned in a forward direction may normally emit light, but light emitting elements aligned in a reverse direction may not normally emit light. The light emitting elements aligned in the forward direction may be light emitting elements in which a p-type semiconductor layer is disposed adjacent to an electrode having a high potential in case that the display device is driven, among the first electrode ELT1 and the second electrode ELT2. The light emitting elements aligned in the reverse direction may be light emitting elements in which an n-type semiconductor layer is disposed adjacent to an electrode having a high potential in case that the display device is driven, among the first electrode ELT1 and the second electrode ELT2. For example, referring to FIGS. 4 and 5B, in case that the transistor TR is connected to the first electrode ELT1 the power line PL is connected to the second electrode ELT2, and the display device is driven, in a case where the current flows from the transistor TR to the power line PL via the light emitting element LD, first, second, fifth, sixth, eighth, and ninth light emitting elements LD1, LD2, LD5, LD6, LD8, and LD9 may normally emit light, but third, fourth, seventh, and tenth light emitting elements LD3, LD4, LD7, and LD10 may not emit light among the plurality of light emitting elements LD1 to LD10. Therefore, in a process of aligning the plurality of light emitting elements LD1 to LD10 between the first electrode ELT1 and the second electrode ELT2, aligning the plurality of light emitting elements LD1 to LD10 to be biased in a same direction may be important.

Figure 6A:
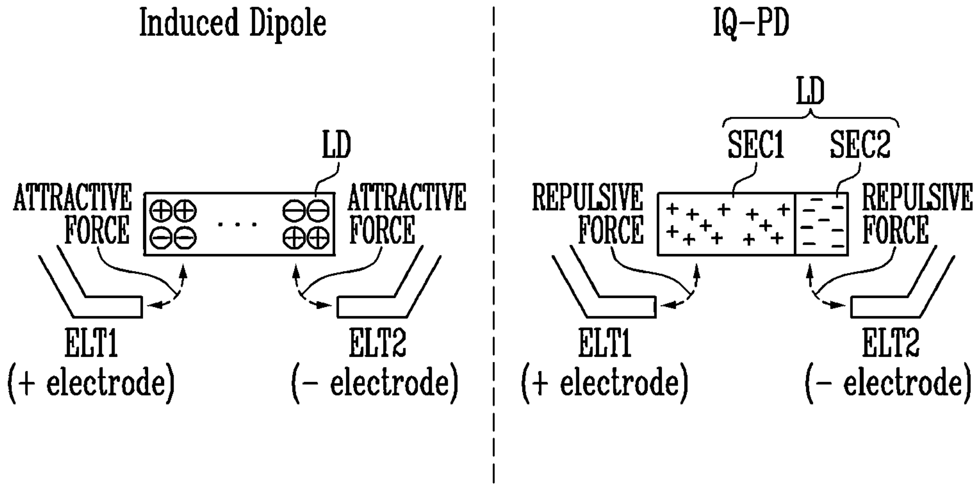
FIGS. 6A and 6B are schematic diagrams illustrating a type of dipole moment generated in the light emitting element and force acting on the light emitting element according to the type during a positive half cycle of an AC voltage applied between a first electrode and a second electrode, in an embodiment.
Figure 6B:
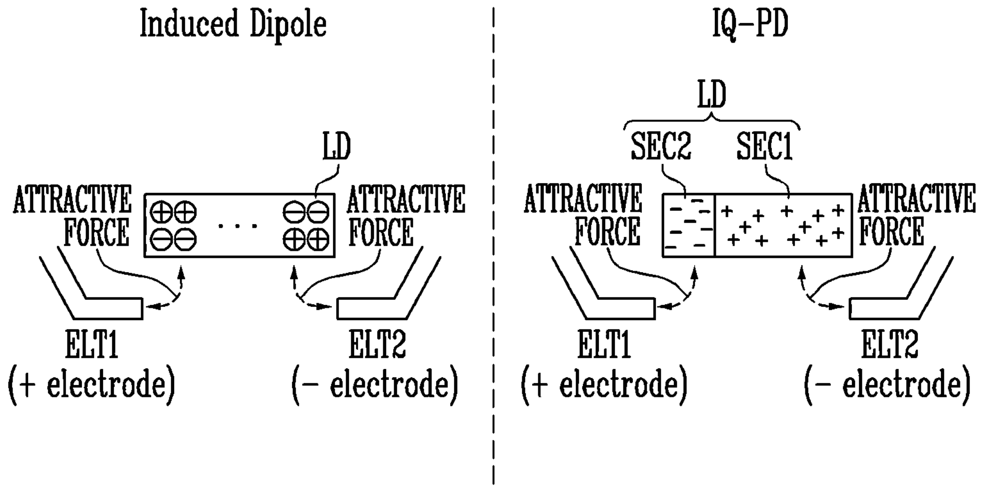

FIGS. 6A and 6B are schematic diagrams illustrating a type of dipole moment generated in the light emitting element and force acting on the light emitting element according to the type during a positive half cycle of the AC voltage applied between the first electrode and the second electrode, in an embodiment.

In an embodiment, in case that the AC voltage is applied between the first electrode ELT1 and the second electrode ELT2, a positive voltage and a negative voltage may be alternately applied between the first electrode ELT1 and the second electrode ELT2. For example, the positive voltage may be applied between the first electrode ELT1 and the second electrode ELT2 during a half cycle, and a negative voltage may be applied during a next half cycle. The first electrode ELT1 and the second electrode ELT2 may have polarities opposite to each other. For example, in case that the first electrode ELT1 is an anode (positive electrode), the second electrode ELT2 may be a cathode (negative electrode). For example, in case that the first electrode ELT1 is a cathode, the second electrode ELT2 may be an anode. By way of example, FIGS. 6A and 6B may show a case where the first electrode ELT1 is the anode and the second electrode ELT2 is the cathode.

In FIGS. 6A and 6B, each of light emitting elements shown on a left side and a right side may indicate an induced dipole and an induced quasi-permanent dipole (IQ-PD).

The induced dipole may be generated by an electric field formed around the light emitting element. By way of example, the induced dipole may be generated by polarization in case that the electric field is formed around the light emitting element. Referring to FIGS. 6A and 6B, in case that the first electrode ELT1 is the anode and the second electrode ELT2 is the cathode, a negative charge may be induced in an area adjacent to the first electrode ELT1 of the light emitting element, and a positive charge may be induced in an area adjacent to the second electrode ELT2. Accordingly, attractive force may act between the first electrode ELT1 and the second electrode ELT2, and the induced dipole.

The IQ-PD may be generated by an electric field formed around the light emitting element. By way of example, in case that an electric field of a forward bias direction is formed around the light emitting element, electrons moved from the n-type semiconductor layer SEC1 may exist in the p-type semiconductor layer SEC2, holes moved from the p-type semiconductor layer SEC2 may exist in the n-type semiconductor layer SEC1, and thus the IQ-PD may be generated. In an embodiment, a width of the p-type semiconductor layer SEC2 of the light emitting element may be narrower than a width of the n-type semiconductor layer SEC1. Therefore, a density of the electrons in the p-type semiconductor layer SEC2 may be greater than a density of the holes in the n-type semiconductor layer SEC1. Therefore, in FIGS. 6A and 6B, an influence of the p-type semiconductor layer SEC2 received from the first electrode ELT1 or the second electrode ELT2 may be greater than an effect of the n-type semiconductor layer SEC1 received from the first electrode ELT1 or the second electrode ELT2.

Referring to FIG. 6A, in case that the first electrode ELT1 is the anode, the second electrode ELT2 is the cathode, and the light emitting element is disposed so that the p-type semiconductor layer SEC2 of the light emitting element is adjacent to the second electrode ELT2, repulsive force may act on the IQ-PD. A magnitude of the repulsive force acting on the IQ-PD may increase as a level of a voltage applied between the first electrode ELT1 and the second electrode ELT2 increases. Referring to FIG. 6A, since the attractive force acts on the induced dipole and the repulsive force acts on the IQ-PD, in case that the magnitude of the repulsive force acting on the IQ-PD (by way of example, the p-type semiconductor layer) is greater than the attractive force acting on the induced dipole, the light emitting element may be switched. Switching may mean that a direction in which the light emitting elements are biased changes to a directly opposite direction.

Referring to FIG. 6B, in case that the first electrode ELT1 is the anode, the second electrode ELT2 is the cathode, and the light emitting element is disposed so that the p-type semiconductor layer SEC2 of the light emitting element is adjacent to the first electrode ELT1, attractive force may act on the IQ-PD. In FIG. 6B, since the attractive force acts on both of the induced dipole and the IQ-PD, the light emitting element may not be switched.

Figure 7A:
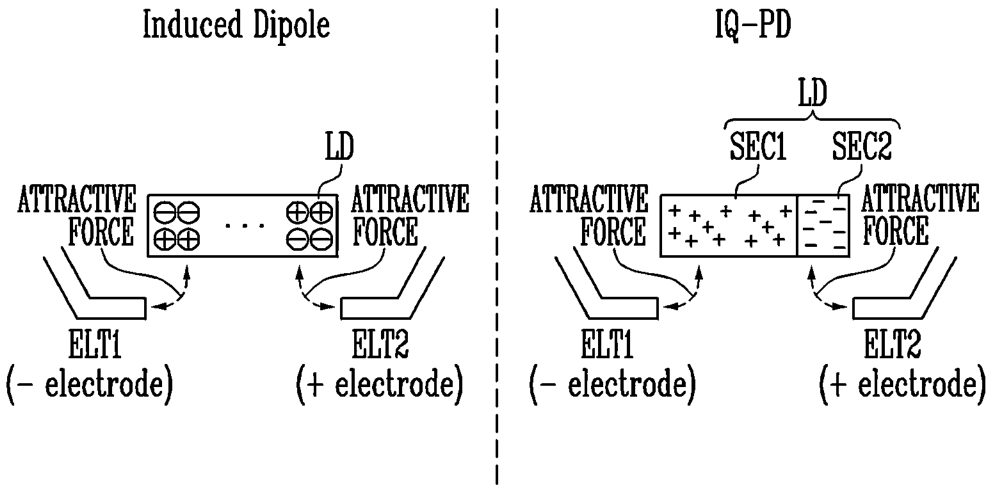
FIGS. 7A and 7B are schematic diagrams illustrating a type of dipole moment generated in the light emitting element and force acting on the light emitting element according to the type during a negative half cycle of the AC voltage applied between the first electrode and the second electrode, in an embodiment.
Figure 7B:
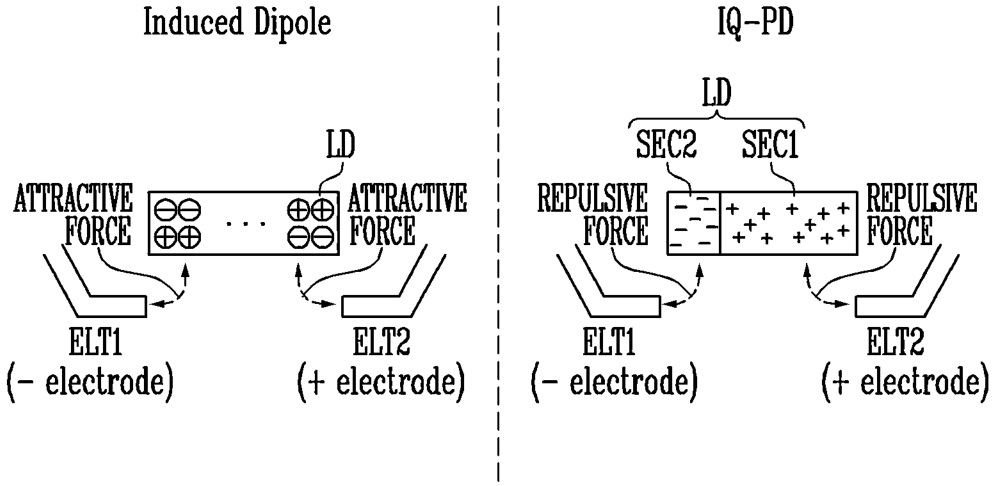

FIGS. 7A and 7B are schematic diagrams illustrating a type of dipole moment generated in the light emitting element and force acting on the light emitting element according to the type during a negative half cycle of the AC voltage applied between the first electrode and the second electrode, in an embodiment.

By way of example, FIGS. 7A and 7B may illustrate a case where the first electrode ELT1 is the cathode and the second electrode ELT2 is the anode.

In FIGS. 7A and 7B, each of light emitting elements shown on a left side and a right side may indicate an induced dipole and an induced quasi-permanent dipole (IQ-PD).

Referring to FIGS. 7A and 7B, in case that the first electrode ELT1 is the cathode and the second electrode ELT2 is the anode, a positive charge may be induced in an area adjacent to the first electrode ELT1 of the light emitting element, and a negative charge may be induced in an area adjacent to the second electrode ELT2. Accordingly, attractive force may act between the first electrode ELT1 and the second electrode ELT2, and the induced dipole.

Referring to FIG. 7A, in case that the first electrode ELT1 is the cathode, the second electrode ELT2 is the anode, and the light emitting element is disposed so that the p-type semiconductor layer SEC2 of the light emitting element is adjacent to the second electrode ELT2, attractive force may act on the IQ-PD. Referring to FIG. 7A, since attractive forces act on both of the induced dipole and the IQ-PD, the light emitting element may not be switched.

Referring to FIG. 7B, in case that the first electrode ELT1 is the cathode, the second electrode ELT2 is the anode, and the light emitting element is disposed so that the p-type semiconductor layer SEC2 of the light emitting element is adjacent to the first electrode ELT1, repulsive force may act on the IQ-PD. A magnitude of the repulsive force acting on the IQ-PD may increase as a level of a voltage applied between the first electrode ELT1 and the second electrode ELT2 increases. Referring to FIG. 7B, since the attractive force acts on the induced dipole and the repulsive force acts on the IQ-PD, in case that the magnitude of the repulsive force acting on the IQ-PD (by way of example, the p-type semiconductor layer) is greater than the attractive force acting on the induced dipole, the light emitting element may be switched.

As described with reference to FIGS. 6A, 6B, 7A, and 7B, the light emitting element may be switched in a case where the first electrode ELT1 is the anode, the second electrode ELT2 is the cathode, and the light emitting element is disposed so that the p-type semiconductor layer SEC2 of the light emitting element is adjacent to the second electrode ELT2, and a case where the first electrode ELT1 is the cathode, the second electrode ELT2 is the anode, and the light emitting element is disposed so that the p-type semiconductor layer SEC2 of the light emitting element is adjacent to the first electrode ELT1.

Figure 8:
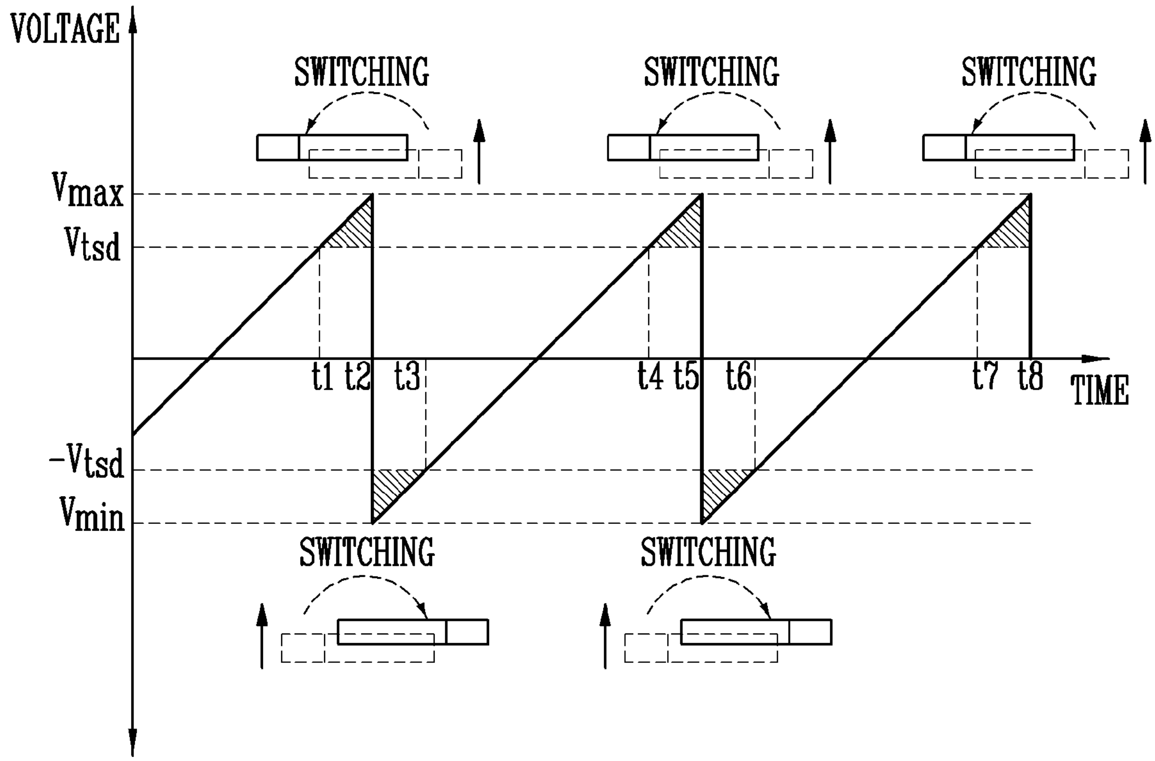
FIG. 8 is a schematic diagram illustrating a waveform of an AC voltage applied between a first electrode and a second electrode in an embodiment.

FIG. 8 is a schematic diagram illustrating a waveform of an AC voltage applied between a first electrode and a second electrode in an embodiment.

Referring to FIG. 8, in an embodiment, the AC voltage applied between the first electrode and the second electrode may have a sawtooth waveform. For example, the voltage applied between the first electrode and the second electrode may gradually increase from a minimum voltage Vmin at a constant slope to reach a maximum voltage Vmax, and rapidly decrease to the minimum voltage Vmin. The light emitting elements may be switched in case that a level of the AC voltage applied between the first electrode and the second electrode is higher than a level of a positive threshold voltage Vtsd or lower than a level of a negative threshold voltage −Vtsd. In other words, the positive threshold voltage Vtsd may be a minimum voltage at which switching of the light emitting element may occur in a positive half cycle of the AC voltage, and the negative threshold voltage −Vtsd may mean a maximum voltage at which switching of the light emitting element may occur in a negative half cycle of the AC voltage. In an embodiment, a level of a threshold voltage may vary according to a size (for example, relative permittivity) of an induced dipole generated in the light emitting element by an output AC voltage provided between the first electrode and the second electrode. For example, the greater the attractive force acting on the induced dipole generated in the light emitting element, the greater an absolute value of the threshold voltage, by the output AC voltage provided between the first electrode and the second electrode. In an embodiment, the level of the threshold voltage may vary according to a viscosity of the ink provided on the substrate together with the light emitting elements in the process in which the light emitting elements are aligned on the alignment electrode. For example, the greater the viscosity of the ink, the greater the absolute value of the threshold voltage.

In an embodiment, the positive threshold voltage and the negative threshold voltage may have a same magnitude and polarities opposite to each other.

Referring to FIGS. 6A and 8, the level of the AC voltage applied between the first electrode ELT1 and the second electrode ELT2 may gradually increase and becomes equal to the level of the positive threshold voltage Vtsd at t1. At this time, as described with reference to FIG. 6A, among the light emitting elements, the light emitting element disposed so that the p-type semiconductor layer SEC2 is adjacent to the second electrode ELT2 which is the cathode may be switched. For example, in periods t1 to t2, t4 to t5, and t7 to t8 where the level of the voltage applied between the first electrode ELT1 and the second electrode ELT2 is greater than the positive threshold voltage Vtsd, the light emitting element disposed so that the p-type semiconductor layer SEC2 is adjacent to the second electrode ELT2 which is the cathode may be switched.

Referring to FIGS. 7B and 8, the level of the AC voltage applied between the first electrode ELT1 and the second electrode ELT2 may reach the maximum voltage Vmax at t2, and rapidly decrease to the minimum voltage Vmin. At this time, as described with reference to FIG. 7B, among the light emitting elements, the light emitting element disposed so that the p-type semiconductor layer SEC2 is adjacent to the first electrode ELT1 which is the cathode may be switched. For example, in periods t2 to t3 and t5 to t6 where the level of the voltage applied between the first electrode ELT1 and the second electrode ELT2 is lower than the negative threshold voltage −Vtsd, the light emitting element disposed so that the p-type semiconductor layer SEC2 is adjacent to the first electrode ELT1 which is the cathode may be switched.

Figure 9:
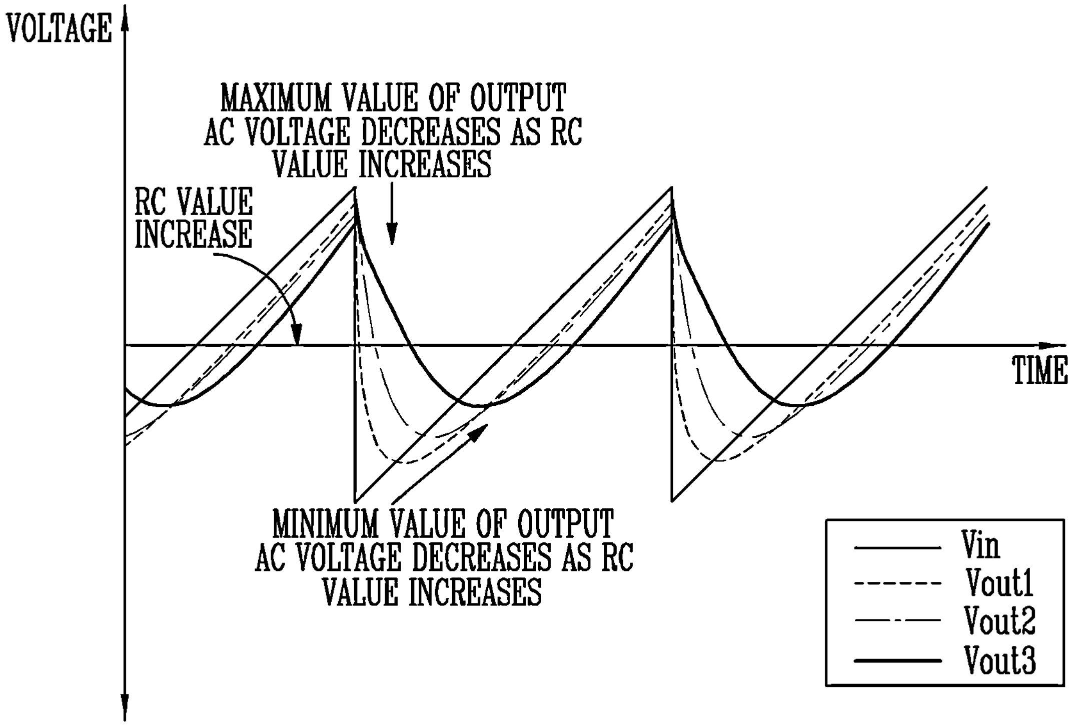
FIG. 9 is a schematic diagram illustrating that an output waveform of an AC voltage applied between a first electrode and a second electrode changes as impedance of a system increases in an embodiment.

FIG. 9 is a schematic diagram illustrating that an output waveform of an AC voltage applied between a first electrode and a second electrode changes as impedance of a system increases in an embodiment.

By way of example, FIG. 9 may illustrate waveforms of an input AC voltage Vin and an output AC voltages Vout1 to Vout4. The input AC voltage Vin may refer to a voltage supplied to electrodes from a power supply through an input terminal to align the light emitting elements on the alignment electrodes (for example, the first electrode ELT1 and the second electrode ELT2 of FIG. 5B). In an embodiment, the waveform of the input AC voltage Vin may have a sawtooth waveform. The output AC voltage Vout may refer to a voltage obtained by actually outputting the input AC voltage Vin, which is input to the input terminal, through the alignment electrodes. The alignment electrodes may be electrically connected through the input terminal and lines. The lines may comprise parasitic impedance. For example, the lines may comprise a parasitic resistor or a parasitic capacitor. In case that the parasitic impedance exists in the line connecting the alignment electrode and the input terminal, the waveform of the input AC voltage Vin input to the input terminal and the waveform of the output AC voltage Vout output through the alignment electrode may be different from each other. By way of example, the waveform of the output AC voltage Vout may be an asymmetrical waveform. The asymmetric waveform may refer to a waveform in which a waveform in a positive half cycle of the output AC voltage Vout and a waveform in a negative half cycle of the output AC voltage Vout are asymmetric with each other.

Referring to FIG. 9, a second output voltage Vout2 may be an output voltage of a case where the parasitic impedance value comprised in the line is greater than that of the first output voltage Vout1. A third output voltage Vout3 may be an output voltage of a case where the parasitic impedance value comprised in the line is greater than that of the second output voltage Vout2. As disclosed in FIG. 9, as an RC value due to the parasitic capacitor and the parasitic resistance increases, the maximum value Vmax of the output AC voltage may decrease and the minimum value Vmin of the output AC voltage may increase due to an RC delay. The RC value may refer to a value obtained by multiplying a resistance value of the parasitic resistor and a capacitance value of the parasitic capacitor. At this time, as the RC value increases, a degree to which the maximum value Vmax of the output AC voltage decreases and a degree to which the minimum value Vmin of the output AC voltage increases may be different. For example, an increase of the minimum value Vmin of the output AC voltage according to an increase of the RC value may be greater than a decrease of the maximum value Vmax of the output AC voltage according to an increase of the RC value.

Figure 10A:
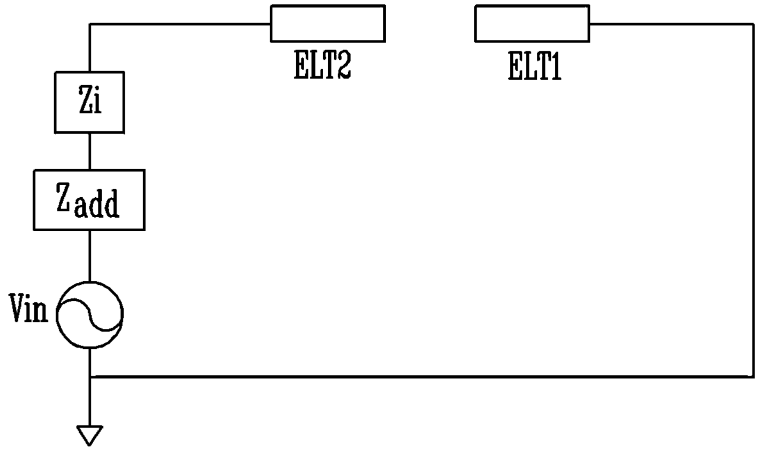
FIGS. 10A and 10B are equivalent circuit diagrams of the system for aligning the light emitting elements on the alignment electrode.
Figure 10B:
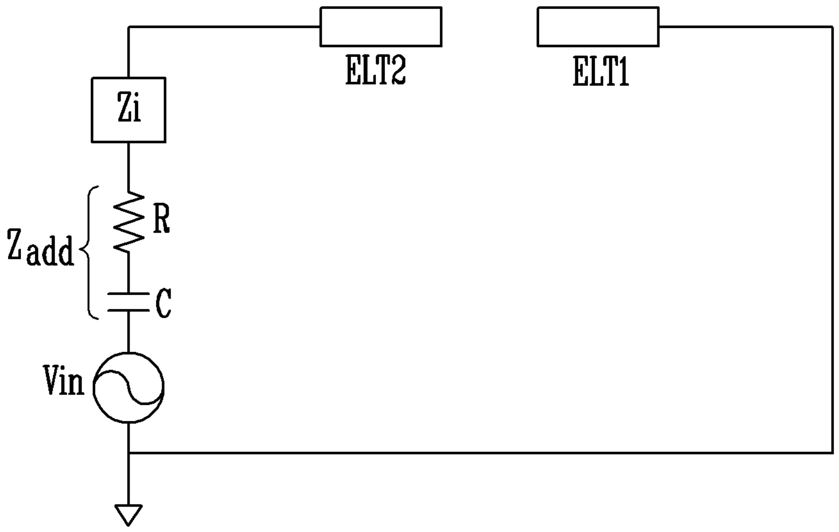

FIGS. 10A and 10B are equivalent circuit diagrams of the system for aligning the light emitting elements on the alignment electrode.

In an embodiment, at least one of a resistor R and a capacitor C may be connected between any one of input terminals to which the AC voltage is input and any one of the first electrode and the second electrode. For example, referring to FIGS. 10A and 10B, the line electrically connecting the input terminal to which the input AC voltage Vin is input and the alignment electrodes ELT1 and ELT2 may further comprise an additional impedance Zadd in addition to a parasitic impedance Zi. The additional impedance Zadd may comprise the resistor R and the capacitor C. According to a resistance value of the resistor R and a capacitance value of the capacitor C comprised in the additional impedance Zadd, the entire RC value of the system for aligning the light emitting elements on the alignment electrode may be adjusted, and thus the waveform of the output AC voltage between the first electrode and the second electrode may be controlled. At this time, the resistor R and the capacitor C connected to the line may be selected so that the maximum value of the output AC voltage between the first electrode and the second electrode is higher than the level of the positive threshold voltage and the minimum value has a magnitude higher than the level of the negative threshold voltage. By way of example, as described with reference to FIGS. 8 and 9, in case that the RC value of the entire system is excessively small, the maximum value Vmax of the output AC voltage may be greater than the positive threshold voltage Vtsd and the minimum value Vmin may be less than the negative threshold voltage −Vtsd. The light emitting element may be switched in both of a positive half cycle and a negative half cycle of the AC voltage applied to the alignment electrodes ELT1 and ELT2. On the other hand, in case that the RC value of the entire system is excessively large, the maximum value Vmax of the output AC voltage may be less than the positive threshold voltage Vtsd and the minimum value Vmin may be greater than the negative threshold voltage −Vtsd. The light emitting element may not be switched not only the negative half cycle but also the positive half cycle of the AC voltage applied to the alignment electrodes ELT1 and ELT2. In order for the light emitting element to be aligned on the alignment electrodes ELT1 and ELT2 in a biased state in one direction, the light emitting element may be required to be switched only in any one half cycle of a positive half cycle and a negative half cycle. Therefore, an optimum RC value may be determined so that the light emitting element may be switched in only one direction, for example, so that the light emitting element may be switched only in the positive half cycle, and the resistor R and the capacitor C connected to the line may be selected based on the determined RC value.

The additional impedance Zadd is for controlling the waveform of the output AC voltage in an alignment process of the light emitting element, and may be a configuration which may not be required in case that driving the display device after the display device is manufactured. Therefore, after the alignment of the light emitting elements is ended in a manufacturing process of the display device, the resistor R and the capacitor C may be removed from the line. For example, after the alignment of the light emitting elements is ended, by opening the line between the resistor R and the capacitor C and the alignment electrode ELT1 or ELT2, the additional impedance Zadd may be electrically separated from the alignment electrodes ELT1 and ELT2.

Figure 11A:
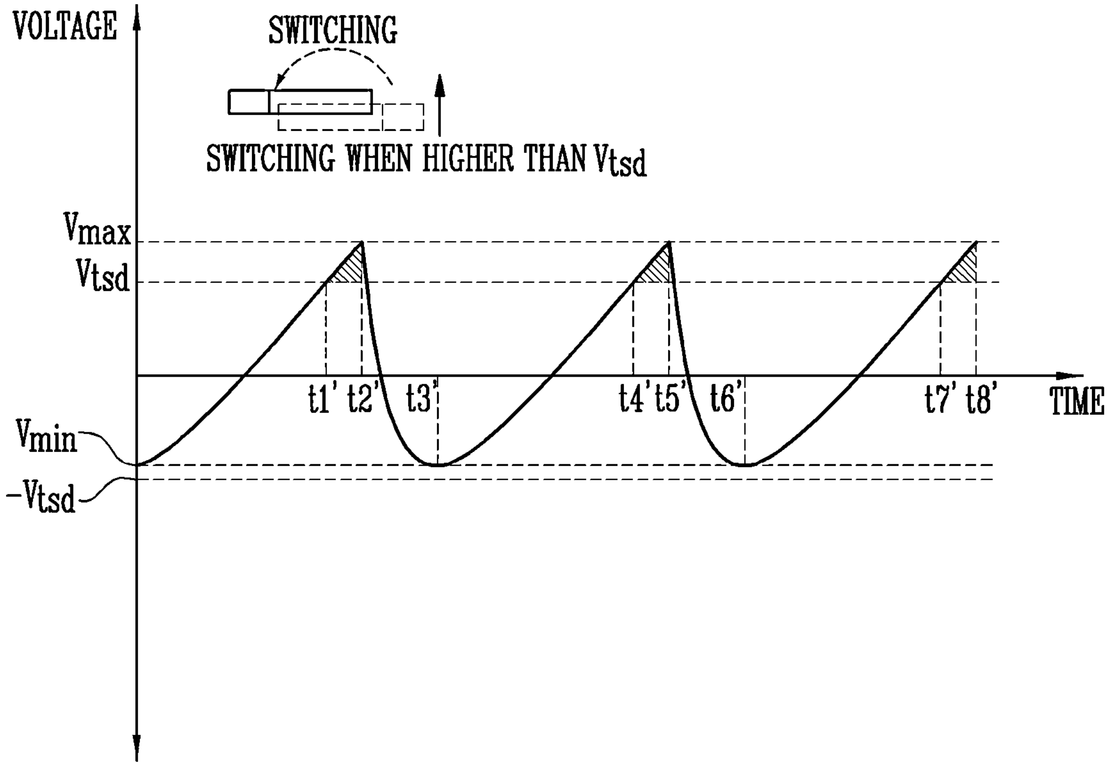
FIGS. 11A and 11B are schematic diagrams illustrating a waveform of an output AC voltage applied between a first electrode and a second electrode according to an embodiment and a state in which light emitting elements are aligned between the first electrode and the second electrode according to an embodiment.
Figure 11B:
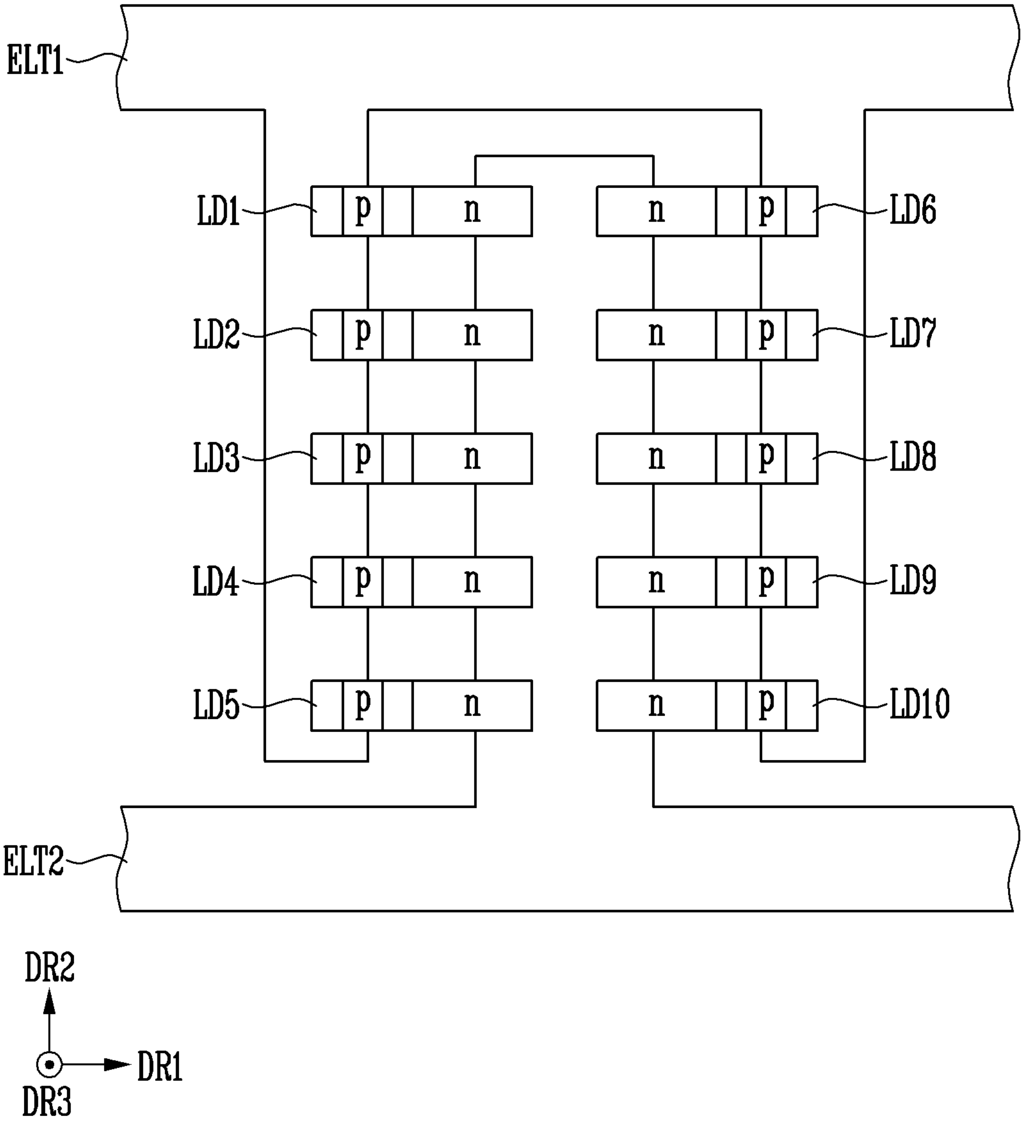

FIGS. 11A and 11B are schematic diagrams illustrating a waveform of an output AC voltage applied between a first electrode and a second electrode according to an embodiment and a state in which light emitting elements are aligned between the first electrode and the second electrode according to an embodiment.

As described based on FIGS. 10A and 10B, the additional impedance Zadd comprising at least one of the resistor R and the capacitor C may be connected to between any one of the input terminals and any one of the first electrode and the second electrode. At this time, the resistor R and capacitor C connected to the line may be selected so that the maximum value of the output AC voltage between the first electrode and the second electrode is higher than the level of the positive threshold voltage and the minimum value has a magnitude of the level of the negative threshold voltage.

Referring to FIG. 11A, in an embodiment, the AC voltage applied between the first electrode and the second electrode may have a sawtooth waveform. The output AC voltage may gradually increase from the minimum voltage Vmin and become equal to the level of the positive threshold voltage Vtsd at t1'. At this time, as described with reference to FIG. 6A, among the light emitting elements, the light emitting element disposed so that the p-type semiconductor layer SEC2 is adjacent to the second electrode ELT2 may be switched.

At t2', the output AC voltage may reach the maximum voltage Vmax. At this time, the level of the maximum voltage Vmax of the output AC voltage may be less than the level of the maximum voltage of the input AC voltage due to the RC delay according to the parasitic impedance Zi and the additional impedance Zadd described with reference to FIG. 10A.

The output AC voltage may gradually decrease at t2' and reach the minimum voltage Vmin at t3'. At this time, the level of the minimum voltage Vmin of the output AC voltage may have a value greater than not only the minimum voltage of the input AC voltage but also the negative threshold voltage −Vtsd. Since the level of the minimum voltage Vmin of the output AC voltage is greater than the negative threshold voltage −Vtsd, the light emitting element may not be switched, differently from the description based on FIG. 7B. For example, the output AC voltage may gradually decrease from the maximum voltage Vmax and increase again before reaching the negative threshold voltage −Vtsd, and thus the light emitting element may not be switched during the negative half cycle.

As described with reference to FIG. 11A, according to an embodiment, the light emitting elements may be switched during the positive half cycle of the AC voltage applied between the first electrode and the second electrode, but may not be switched during the negative half cycle. Accordingly, in the process of aligning the light emitting elements on the alignment electrodes, a bias rate of the light emitting elements may be improved.

FIG. 11B illustrates a state in which light emitting elements are aligned between the first electrode and the second electrode according to an embodiment. According to an embodiment, the light emitting elements LD1 to LD10 may be aligned in the forward direction and seated between the first electrode ELT1 and the second electrode ELT2. For example, referring to FIG. 11B, the light emitting elements LD1 to LD10 may be disposed between the first electrode ELT1 and the second electrode ELT2 in a state in which the p-type semiconductor layer is aligned to be adjacent to the first electrode ELT1. For example, as described with reference to FIG. 4, in case that the transistor TR is connected to the first electrode ELT1, the power line PL is connected to the second electrode ELT2, and the display device is driven, in a case where a current flows from the transistor TR to the power line PL through the light emitting element LD, since all of the plurality of light emitting elements LD1 to LD10 are aligned in the forward direction, the light emitting elements LD1 to LD10 may emit light normally.

Figure 12:
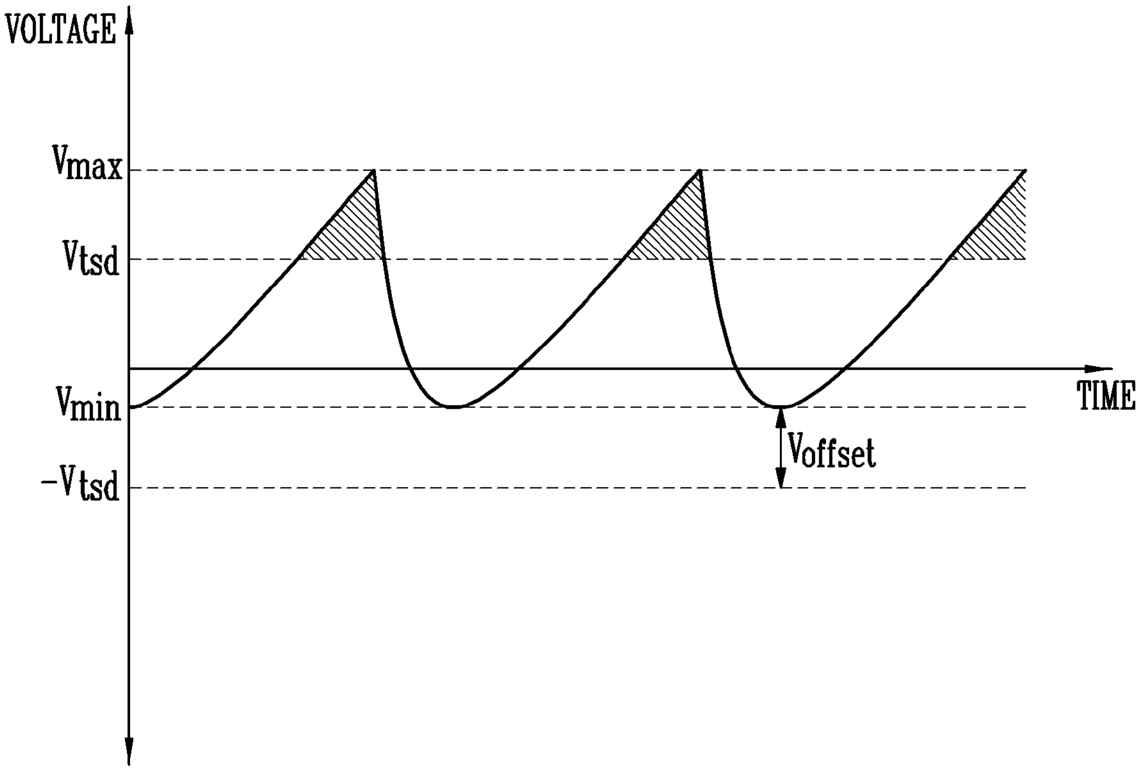
FIG. 12 is a schematic diagram illustrating a case where an AC voltage comprises a DC offset voltage in an embodiment.

FIG. 12 is a schematic diagram illustrating a case where an AC voltage comprises a DC offset voltage in an embodiment.

Referring to FIG. 12, the AC voltage applied between the first electrode and the second electrode may be a voltage comprising the DC offset voltage. In case that the AC voltage comprises the DC offset voltage, asymmetry of the output AC voltage may further increase, and thus the bias rate of the light emitting elements may be further improved.

Although the technical spirit of the disclosure has been described in detail in accordance with the above-described embodiments, it should be noted that the above-described embodiments are for the purpose of description and not of limitation. Those skilled in the art will understand that various modifications are possible within the scope of the technical spirit of the disclosure.

The scope of the disclosure is not limited to the details described in the detailed description of the specification, but should also be defined by the claims. It is also to be construed that all changes or modifications derived from the meaning and scope of the claims and equivalent concepts thereof are comprised in the scope of the disclosure.

What is claimed is:

1. A method of aligning a light emitting element, the method comprising:

providing an ink on a substrate, the ink comprising a solvent and a plurality of light emitting elements in the solvent, a first electrode and a second electrode being disposed on the substrate and spaced apart from each other; and aligning the light emitting elements in a same direction based on applying an alternating current (AC) voltage to the first electrode and the second electrode, wherein the AC voltage is controlled so that a maximum value of an output AC voltage between the first electrode and the second electrode is higher than a first threshold voltage and a minimum value of the output AC voltage has a magnitude higher than a second threshold voltage, and the first threshold voltage and the second threshold voltage have a same magnitude and opposite polarities that cause a portion of the light emitting elements to switch from a first direction to the same direction.

2. The method according to claim 1, wherein the magnitude of the first threshold voltage and the second threshold voltage is determined by a force acting on an induced dipole generated in the plurality of light emitting elements by the output AC voltage provided between the first electrode and the second electrode.

3. The method according to claim 1, wherein a waveform of the output AC voltage changes according to an impedance value of an equivalent circuit electrically connected between the first electrode and the second electrode, and the impedance value is set so that the maximum value of the output AC voltage is higher than the first threshold voltage and the minimum value of the output AC voltage has a magnitude higher than the second threshold voltage.

4. The method according to claim 3, wherein the maximum value of the output AC voltage decreases as the impedance value increases, and the minimum value of the output AC voltage increases as the impedance value increases.

5. The method according to claim 3, wherein at least one of a resistor and a capacitor is electrically connected between any one of input terminals to which the AC voltage is input and any one of the first electrode and the second electrode, and the impedance value is determined based on at least one of the resistor and the capacitor.

6. The method according to claim 5, further comprising:

separating the resistor and the capacitor from the first electrode and the second electrode after the plurality of light emitting elements are aligned to the first electrode and the second electrode.

7. The method according to claim 1, wherein a waveform of the AC voltage has a sawtooth waveform.

8. The method according to claim 1, wherein a waveform of the output AC voltage has an asymmetrical waveform.

9. The method according to claim 1, wherein the AC voltage is a voltage comprising a direct current (DC) offset voltage.

10. A method of manufacturing a display device, the method comprising:

disposing a first electrode and a second electrode spaced apart from the first electrode on a substrate;

providing an ink on a substrate the ink comprising a solvent and a plurality of light emitting elements in the solvent; and aligning the plurality of light emitting elements in a same direction on the first electrode and the second electrode, wherein the aligning of the plurality of light emitting elements on the first electrode and the second electrode comprises applying an alternating current (AC) voltage to the first electrode and the second electrode, the AC voltage is controlled so that a maximum value of an output AC voltage between the first electrode and the second electrode is higher than a first threshold voltage and a minimum value of the output AC voltage has a magnitude higher than a second threshold voltage, and the first threshold voltage and the second threshold voltage have a same magnitude and opposite polarities that cause a portion of the light emitting elements to switch from a first direction to the same direction.

11. The method according to claim 10, wherein a waveform of the output AC voltage changes according to an impedance value of an equivalent circuit connected between the first electrode and the second electrode, and the impedance value is set so that the maximum value of the output AC voltage is higher than the first threshold voltage and the minimum value of the output AC voltage has a magnitude higher than the second threshold voltage.

12. The method according to claim 11, wherein the maximum value of the output AC voltage decreases as the impedance value increases, and the minimum value of the output AC voltage increases as the impedance value increases.

13. The method according to claim 11, wherein at least one of a resistor and a capacitor is electrically connected between any one of input terminals to which the AC voltage is input and any one of the first electrode and the second electrode, and the impedance value is determined based on at least one of the resistor and the capacitor.

14. The method according to claim 13, further comprising:

separating the resistor and the capacitor from the first electrode and the second electrode after the plurality of light emitting elements are aligned to the first electrode and the second electrode.

15. The method according to claim 10, wherein a waveform of the AC voltage has a sawtooth waveform.

16. The method of claim 1, wherein the portion of the light emitting elements in the first direction do not emit light in case that current is applied between the first electrode and the second electrode, and the switch of the portion of the light emitting elements from the first direction to the same direction causes the portion of the light emitting elements to emit light in case that the current is applied between the first electrode and the second electrode.

* * * * *